United States Patent
Wu

(10) Patent No.: US 10,267,981 B1
(45) Date of Patent: Apr. 23, 2019

(54) TERMINAL BLOCK WITH LIGHT GUIDE BAR

(71) Applicants: DINKLE ENTERPRISE CO., LTD., New Taipei (TW); DINKLE ELECTRIC MACHINERY (CHINA) CO., LTD., Kunshan, Jiangsu (CN)

(72) Inventor: Shang-Tsai Wu, New Taipei (TW)

(73) Assignees: DINKLE ENTERPRISE CO., LTD., New Taipei (TW); DINKLE ELECTRIC MACHINERY (CHINA) CO., LTD., Kunshan, Jiangsu (CN)

( * ) Notice: Subject to any disclaimer, the term of this patent is extended or adjusted under 35 U.S.C. 154(b) by 0 days.

(21) Appl. No.: 15/978,085

(22) Filed: May 11, 2018

(51) Int. Cl.
| H01R 13/00 | (2006.01) |
| H01R 12/00 | (2006.01) |
| H01R 4/24 | (2018.01) |
| G02B 6/00 | (2006.01) |
| F21V 8/00 | (2006.01) |
| H01R 12/51 | (2011.01) |
| H01R 4/26 | (2006.01) |

(52) U.S. Cl.
CPC .......... *G02B 6/0088* (2013.01); *G02B 6/0073* (2013.01); *H01R 4/26* (2013.01); *H01R 12/515* (2013.01)

(58) Field of Classification Search
CPC ...... H01R 12/57; H01R 4/4818; H01R 12/52; H01R 12/515
See application file for complete search history.

(56) References Cited

U.S. PATENT DOCUMENTS

| 6,241,550 B1* | 6/2001 | Laity | H01R 13/7172 439/490 |
| 6,537,110 B1* | 3/2003 | Korsunsky | H01R 13/6658 439/38 |
| 7,125,280 B1* | 10/2006 | Lee | H01R 13/717 439/490 |
| 7,194,183 B2* | 3/2007 | Thornton | G02B 6/0001 385/139 |
| 8,519,864 B2* | 8/2013 | Yajima | G02B 6/4246 340/815.65 |
| 9,466,897 B1* | 10/2016 | Wu | H01R 9/2491 |
| 9,466,911 B1* | 10/2016 | Wu | H01R 4/4836 |
| 9,612,391 B2* | 4/2017 | Wu | G02B 6/0075 |
| 9,660,395 B2* | 5/2017 | Yeom | H01R 13/46 |
| 10,116,105 B2* | 10/2018 | Wu | H01R 13/7175 |

* cited by examiner

*Primary Examiner* — Xuong M Chung Trans
(74) *Attorney, Agent, or Firm* — Chun-Ming Shih; HDLS IPR Services

(57) ABSTRACT

A terminal block includes an insulative casing, a bottom plate, conductive terminals and a light module. The insulative casing has first chambers, second chambers and through holes separately communicating with the first chambers. The bottom plate coves the first chambers. A side of the bottom plate and the second chambers are formed with a circuit board slot. The bottom plate is extended with light guide bars separately passing through and exposed in the through holes. The conductive terminals are separately received in the first chambers. Each conductive terminal is extended with a contact sheet disposed in the second chamber. The light module includes a circuit board, LEDs mounted on the circuit board and conductive units. When the circuit board is detachably inserted into the circuit board slot, the LEDs correspond to the light guide bars in position, and each conductive unit electrically connects to one of the contact sheets.

10 Claims, 6 Drawing Sheets

TERMINAL BLOCK WITH LIGHT GUIDE BAR

BACKGROUND OF THE INVENTION

1. Technical Field

The invention relates to terminal block structures, particularly to a terminal block with a light guide bar.

2. Related Art

Terminal blocks are widely applied in electric apparatuses such as industrial calculators, UPS and power supplies), industrial control devices such as electromechanical systems, refrigerators and programmable controllers) or appliances such as air conditioners, washing machines or ovens. Terminal blocks are electric connecting devices which allow multiple cables to connect.

A conventional terminal block is composed of an insulative seat and terminals. The insulative seat is provided with elastic sheets for fastening cables. Cables are inserted into the insulative seat to connect with the terminals by a screw driver. Finally, remove the screw driver to make the elastic sheets press the cables to fasten in the insulative seat.

However, when such a terminal block is being operated for wiring, a detector is needed for confirming connections between cables and terminals. This detecting process is time-consuming and laborious.

SUMMARY OF THE INVENTION

An object of the invention is to provide a terminal block with a light guide bar, which uses lighting of the light guide bar to indicate confirmation of cable connection. This can simplify confirmation process of wiring operation.

To accomplish the above object, the terminal block with a light guide bar of the invention includes an insulative casing, having first chambers, second chambers communicating with the first chambers, an opening exposing the first and second chambers and through holes separately communicating with the first chambers; a bottom plate, covering the first chambers and a portion of the opening, the second chambers and another portion of the opening being formed with a circuit board slot, and the bottom plate being integratedly extended with light guide bars separately passing through and exposed in the through holes; conductive terminals, separately received in the first chambers, and each conductive terminal being extended with a contact sheet disposed in the second chamber; and a light module, comprising a circuit board, light emitting diodes (LEDs) mounted on the circuit board and conductive units, wherein when the circuit board is detachably inserted into the circuit board slot, the LEDs correspond to the light guide bars in position, and each conductive unit electrically connects to one of the contact sheets.

The light guide bars integratedly extend from the bottom plate to omit conventional fixed channels. As a result, the terminal block has advantages of simple structure, convenient assembling, size reduction and cost reduction.

DETAILED DESCRIPTION OF THE INVENTION

Figure 1:
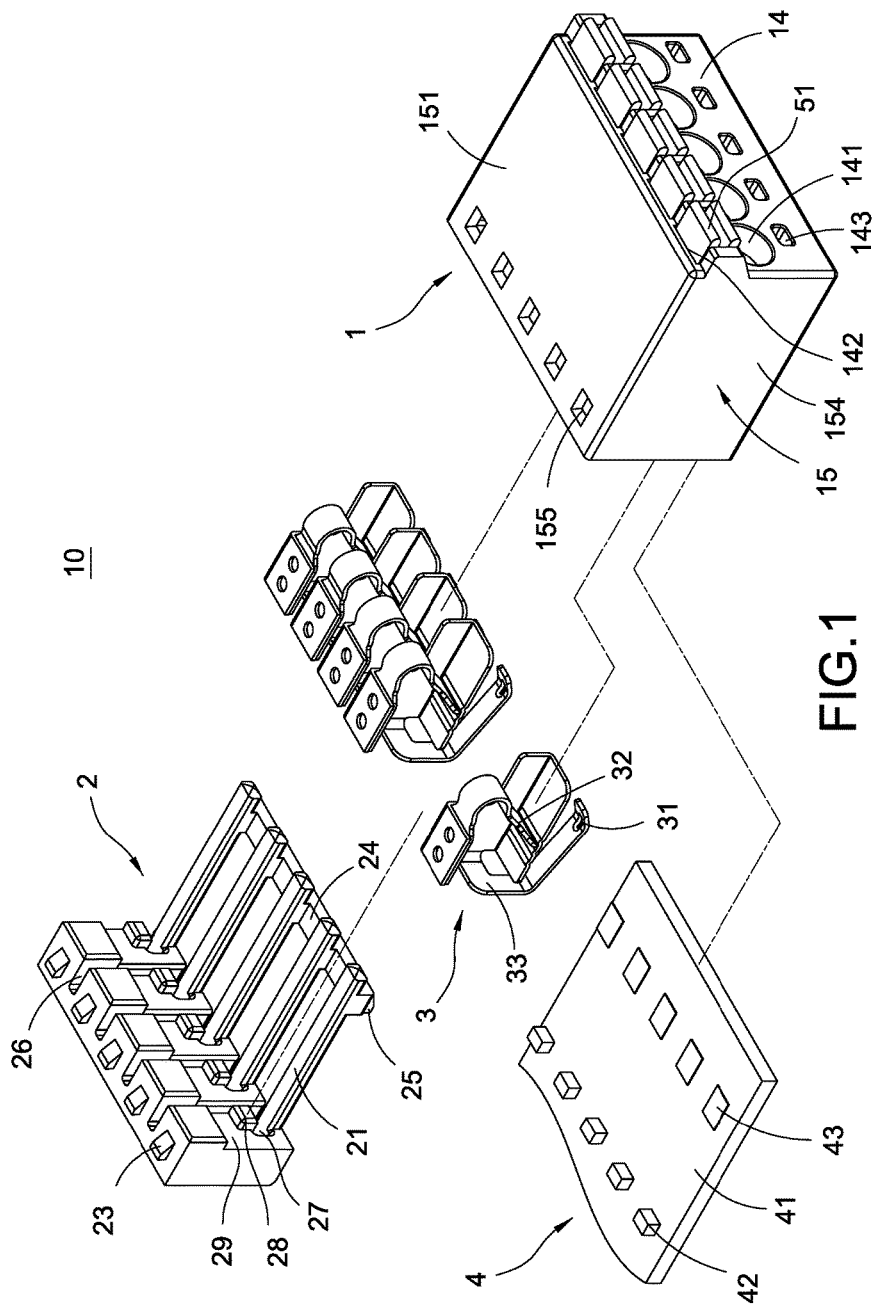
FIG. 1 is an exploded view of the invention.

Please refer to FIGS. 1-4. The invention provides a terminal block 10, which includes an insulative casing 1, a bottom plate 2, conductive terminals 3 and a light module 4.

As shown, the insulative casing 1 has first chambers 11 and second chambers 12 communicating with the first chambers 11. The insulative casing 1 further has a bottom wall 13, a top wall and a side wall 15. The bottom wall 13 is provided with an opening 131 exposing the first and second chambers 11, 12. The top wall 14 is formed with cable holes 141, passing holes 142 and through holes 143, all which separately communicate with the first chambers 11. Each through hole 143 is located at a side of one of the cable holes 141.

In addition, the side wall 15 has a front side wall 151, a rear side wall 152, a left side wall 153 and a right side wall 154. The front side wall 151 and the rear side wall 152 are provided with first engaging troughs 155 and second engaging troughs 156, respectively.

Partitions 17 are extended from the front side wall 151 toward the rear side wall 152. The first chambers 11 are separately formed between the left side wall 153, the right-side wall 154 and the partitions 17. The second chambers 12 are formed between the rear side wall 152 and the partitions 17. Each of the left side wall 153 and partitions 17 is extended with a loading block 18. Each loading block 18 is extended with a stopping portion 181.

As shown in FIGS. 1-4, the bottom plate 2 covers the first chambers 11 and a portion of the opening 131. The second chambers 12 and another portion of the opening 131 is formed with a circuit board slot 16. The bottom plate 2 is integratedly extended with light guide bars 21 separately passing through and exposed in the through holes 143. Each light guide bar 21 has a light inlet 211 exposed in the bottom plate 2.

Each light guide bar 21 is a 1-shaped body. The bottom plate 2 and light guide bars 21 are made of a light-permeable material or the bottom plate 2 is made of an opaque material but the light guide bars 21 are made of a light-permeable material.

In addition, there are first engaging blocks 23 extended from the bottom plate 2. Each first engaging block 23 engages with one of the first engaging troughs 155. A transversal rod 24 extends from the light guide bars 21. Second engaging blocks 25 extend from the transversal rod 24. Each of the second engaging block 25 engages with one of the second engaging troughs 156. As a result, both the bottom plate 2 and the light guide bars 21 are secured in the insulative casing 1.

The bottom plate 2 is formed with first slits 26, second slits 27, protrusions 28 and cavities 29. Each partition 17 is embedded into one of the first slits 26 and each loading block 18 is embedded into one of the second slits 27.

As shown in FIGS. 1-4, each conductive terminal 3 is received in one of the first chambers 11. Each first conductive terminal 3 is extended with a contact sheet 31 disposed in one of the second chambers 12. Each conductive terminal 3 is disposed on one of the loading blocks 18 and stopped by the stopping portion 181 so that the conductive terminals 3 can be separately secured on the loading blocks 18.

Each conductive terminal 3 is extended with an elastic sheet 32 and an engaging section 33 embedded in one of the cavities 29. Each conductive terminal 3 engages with one of the protrusions 28. As a result, the conductive terminals 3 are secured on the bottom plate 2.

The light module 4 includes a circuit board 41, light emitting diodes (LEDs) 42 mounted on the circuit board 41 and conductive units 43. When the circuit board 41 is inserted into the circuit board a lot 16, each LED 42 corresponds to one of the light guide bars 21 in position and each conductive unit 43 electrically connects to one of the contact sheet 32. Each LED 42 has a light outlet 421 corresponding to one of the light inlets 211 in position so that the lights from the LEDs 42 can project to the light inlets 211 with being parallel to the circuit board 41 in a planar direction. After that, the lights from the LEDs 42 can be delivered to the through holes 143 through the light guide bars 21.

The terminal block 10 of the invention further includes handle members 5. Each handle member 5 is movably received in one of the passing holes 142 and has a pressing portion 51 protruding from the passing hole 142. Each elastic sheet 32 is disposed between the handle member 5 and the conductive terminal 3 and closes the cable hole 141.

When the pressing portion 51 is pressed, the handle member 12 will press the elastic sheet 32 and drive the elastic sheet 32 to open the cable hole 141 to make a cable (not shown) can be smoothly inserted into the cable hole 141. Finally, when the pressing portion 51 is released, the handle member 12 will not press the elastic sheet 32 to restore the elastic sheet 32 to pinch the cable.

Figure 2:
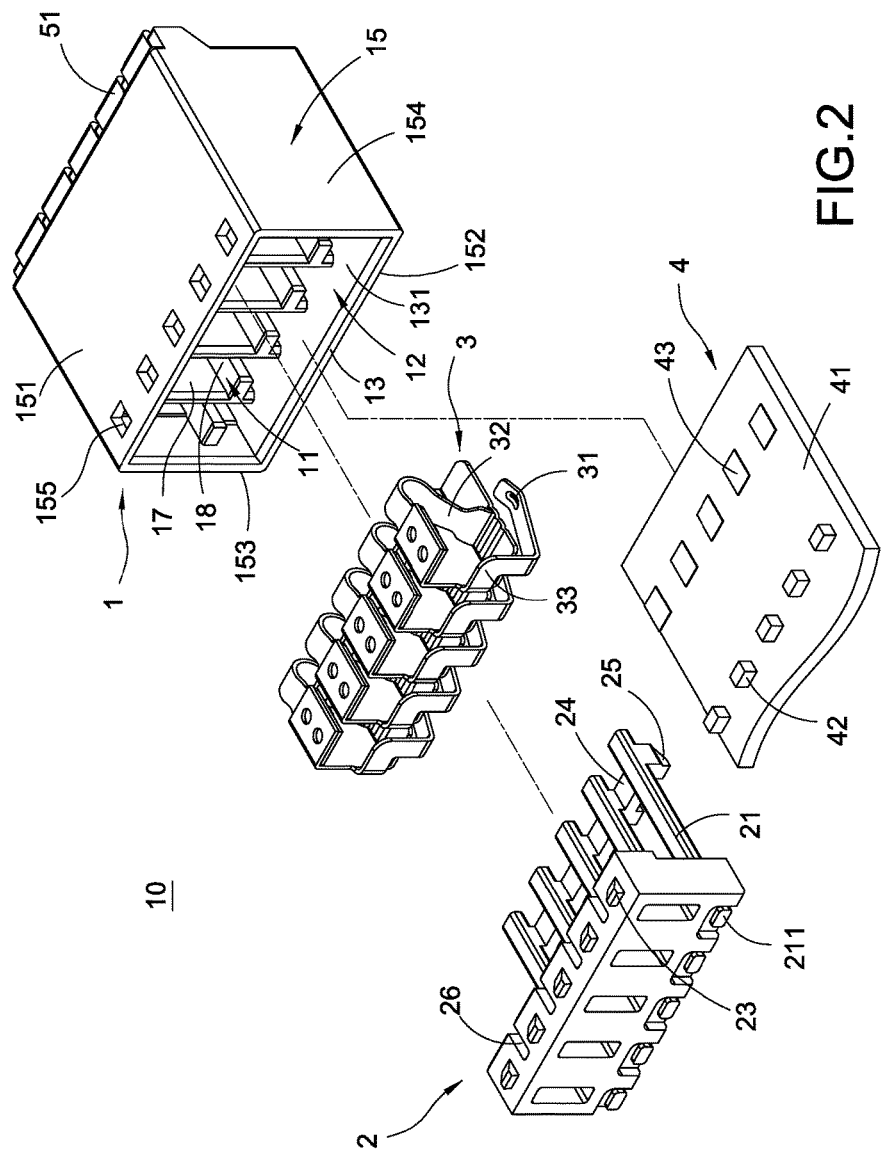
FIG. 2 is another exploded view of the invention.
Figure 3:
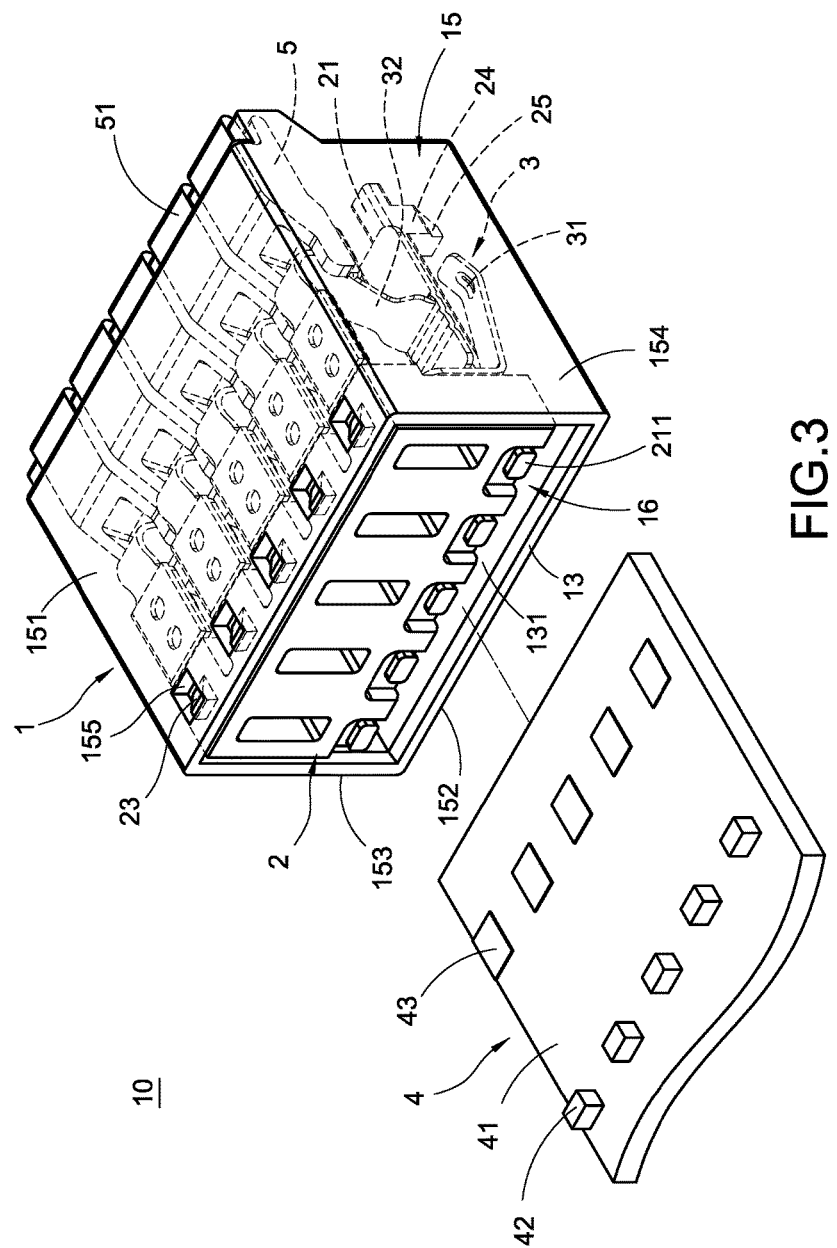
FIG. 3 is a schematic view of the invention in use.
Figure 4:
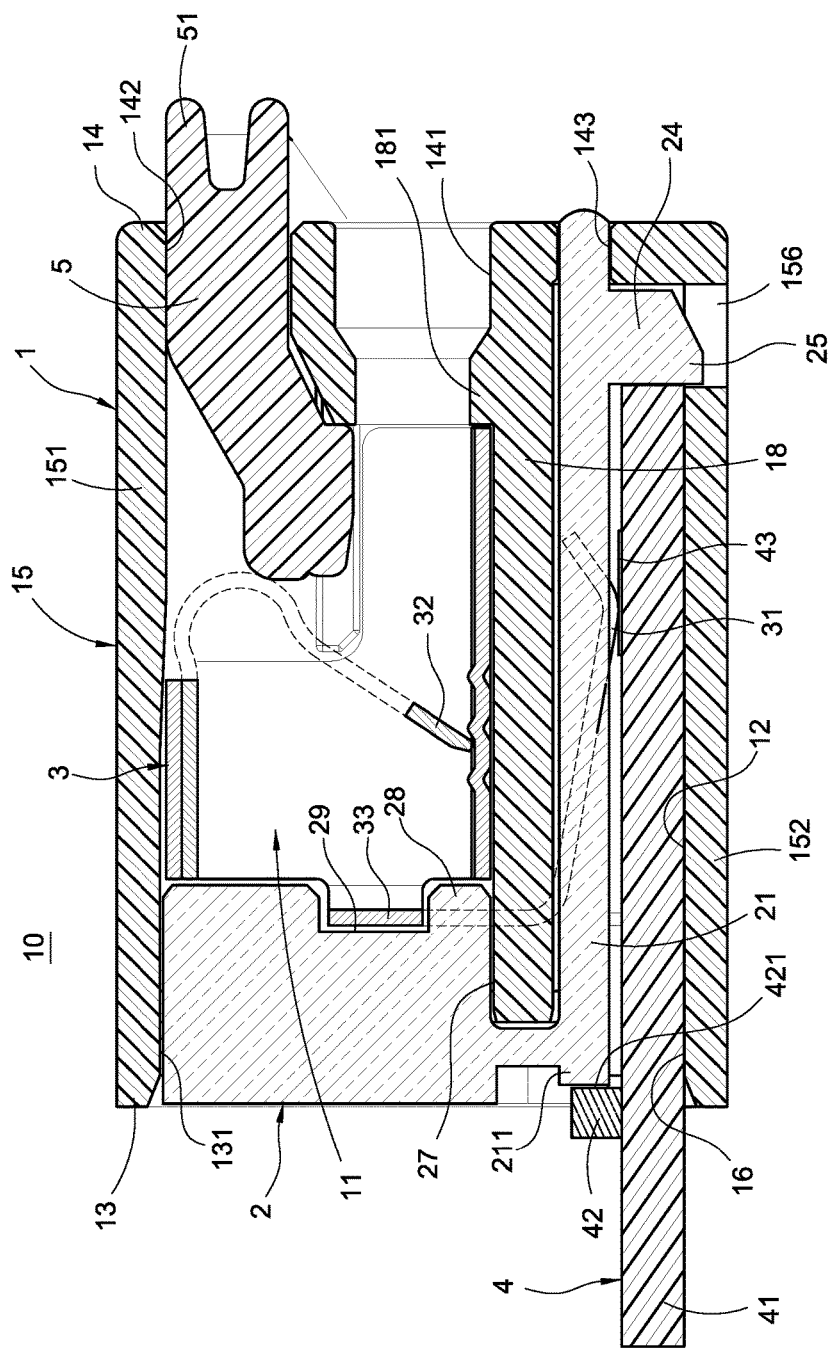
FIG. 4 is a cross-sectional view of the invention.

As shown in FIGS. 2-3, when the terminal block 10 of the invention is used, the circuit board 41 is inserted into the circuit board slot 16, the LEDs 42 separately correspond to the light guide bars 21, and the conductive units 43 separately electrically connect to the contact sheets 32. When a cable is inserted into the cable hole 141 and electrically connects with the conductive terminal 3, the contact sheet 32 will provide electricity to the LED 42 through the conductive unit 43 to light up and then the light from the LED 42 will be delivered to the through hole 143. As a result, a user can simply confirm the connection between the cable and the conductive terminal 3 to simplify the detecting step of wiring operation.

Contrarily, if the cable does not connect with the conductive terminal 3, the LED 42 cannot light up. No lighting can make a user be aware of disconnection between the cable and the conductive terminal 3.

Besides, a conventional bottom plate and light guide bar are two separate components, so the bottom plate needs to be provided with fixed channels to receive the light guide bars. If the fixed channel is too small in size, its manufacture will be difficult and the bottom plate cannot reduce its size. However, the light guide bars 21 of the invention are to integratedly extend from the bottom plate 2 to form a single piece so that fixed channels can be omitted and the terminal block 10 has advantages of simple structure, convenient assembling, size reduction and cost reduction.

Also, partitions 17 are extended from the insulative casing 1. The first chambers 11 are separately formed between the partitions 17. The partitions 17 separately engage with the first slits. As a result, each light guide bar 21 can be effectively shaded by the partitions 17 to avoid lights from the different light guide bars 21 interfere with each other to prevent misjudgment of connectivity between a cable and the conductive terminals 3. The light from a single LED 42 can be delivered to only one through hole 143 though a single light guide bar 21 to improve detecting accuracy of wiring operation.

Figure 5:
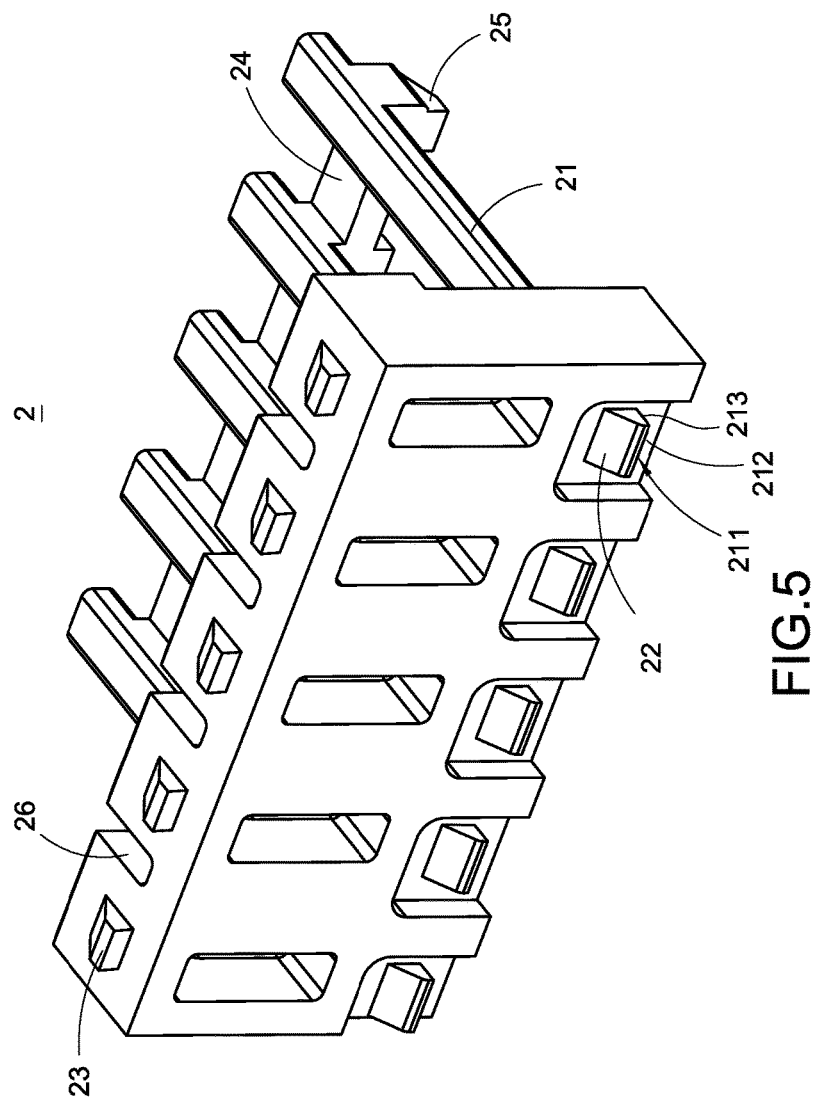
FIG. 5 is a perspective schematic view of another embodiment of the invention.
Figure 6:
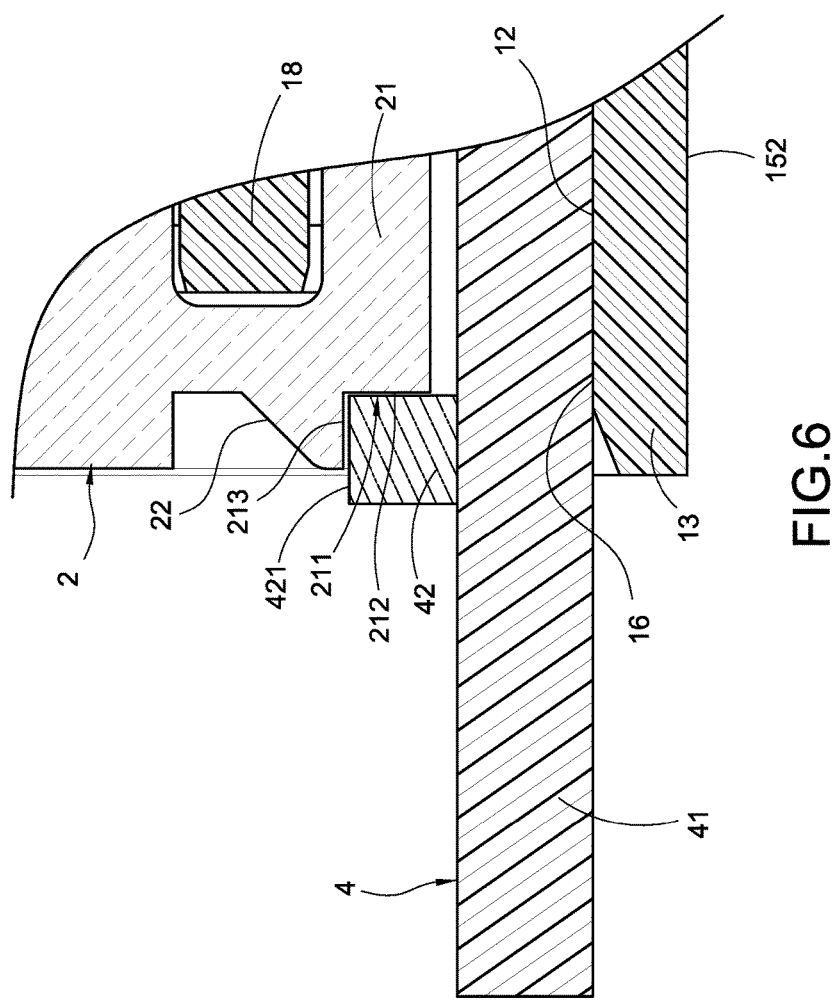
FIG. 6 is a partially enlarged cross-sectional view of another embodiment of the invention.

Please refer to FIGS. 5-6, which show another embodiment of the invention. This embodiment is substantially identical to the above one shown in FIGS. 1-4. Their difference is the light outputting direction of the LEDs 42.

In detail, in this embodiment, each light inlet 211 is provided with a recess 212. Each recess 212 has an inner wall 213 parallel to the light guide bar 21. The bottom plate 2 has reflecting slants 22 separately corresponding to one of the inner walls 213. The LED 42 is embedded into the recess 212. Each light outlet 421 corresponds to one of the inner walls 213 in position. As a result, light form the LED 42 can be projected to the inner wall 213 in a planar direction perpendicular to the circuit board 41, and then the light will be reflected to the light guide bar 21 though the reflecting slant 22. Finally, the light from the LED 42 is delivered to the through hole 143 through the light guide bar 21. Thus, the same functions as the embodiment shown in FIGS. 1-4 can be accomplished.

It will be appreciated by persons skilled in the art that the above embodiments have been described by way of example only and not in any limitative sense, and that various alterations and modifications are possible without departure from the scope of the disclosed example as defined by the appended claims.

What is claimed is:

1. A terminal block with a light guide bar, comprising:
   an insulative casing, having first chambers, second chambers communicating with the first chambers, an opening exposing the first and second chambers and through holes separately communicating with the first chambers;
   a bottom plate, covering the first chambers and a portion of the opening, the second chambers and another portion of the opening being formed with a circuit board slot, and the bottom plate being integratedly extended with light guide bars separately passing through and exposed in the through holes;
   conductive terminals, separately received in the first chambers, and each conductive terminal being extended with a contact sheet disposed in the second chamber; and
   a light module, comprising a circuit board, light emitting diodes (LEDs) mounted on the circuit board and conductive units, wherein when the circuit board is detachably inserted into the circuit board slot, the LEDs correspond to the light guide bars in position, and each conductive unit electrically connects to one of the contact sheets.

2. The terminal block with a light guide bar of claim 1, wherein the insulative casing has a bottom wall, a top wall and a side wall, the opening is located in the bottom wall, the cable holes are located in the top wall, and each light guide bar is a 1-shaped body.

3. The terminal block with a light guide bar of claim 2, wherein each light guide bar has a light inlet exposed in the bottom plate, each LED has a light outlet corresponding to one of the light inlets in position.

4. The terminal block with a light guide bar of claim 2, wherein each light guide bar has a light inlet exposed in the bottom plate, each light inlet is provided with a recess, each recess has an inner wall parallel to the light guide bar, the bottom plate has reflecting slants separately corresponding to one of the inner walls, each LED is embedded into one of the recesses, and each light outlet corresponds to one of the inner walls in position.

5. The terminal block with a light guide bar of claim 4, wherein the side wall has a front side wall and a rear side wall, which are opposite to each other, the front side wall and the rear side wall are provided with first engaging troughs and second engaging troughs, respectively, first engaging blocks extend from the bottom plate, each first engaging block engages with one of the first engaging troughs, a transversal rod extends from the light guide bars, second engaging blocks extend from the transversal rod, and each of the second engaging block engages with one of the second engaging troughs.

6. The terminal block with a light guide bar of claim 4, wherein the side wall has a front side wall, a rear side wall, a left side wall and a right side wall, partitions extend from the front side wall toward the rear side wall, the first chambers are separately formed between the left side wall, the right side wall and the partitions, and the second chambers are formed between the rear side wall and the partitions.

7. The terminal block with a light guide bar of claim 6, wherein each of the left side wall and partitions is extended with a loading block, each loading block is extended with a stopping portion, and each conductive terminal is disposed on one of the loading blocks and stopped by the stopping portion.

8. The terminal block with a light guide bar of claim 7, wherein the bottom plate is formed with first slits, second slits, protrusions and cavities, each partition is embedded into one of the first slits, each loading block is embedded into one of the second slits, each conductive terminal has an engaging section embedded in one of the cavities, each conductive terminal engages with one of the protrusions.

9. The terminal block with a light guide bar of claim 8, further comprising handle members, the top wall being formed with cable holes and passing holes, each through hole being located at a side of one of the cable holes, each handle member being movably received in one of the passing holes and having a pressing portion protruding from the passing hole.

10. The terminal block with a light guide bar of claim 9, wherein an elastic sheet extends from each conductive terminal, each elastic sheet is disposed between the handle member and the conductive terminal and closes the cable hole, and each handle member is capable of pressing one of the elastic sheets to drive the elastic sheet to open the cable hole.

\* \* \* \* \*